June 22, 1965   N. BERKOWITZ ETAL   3,190,701
PIPELINE TRANSPORTATION OF SOLIDS
Filed Feb. 1, 1963
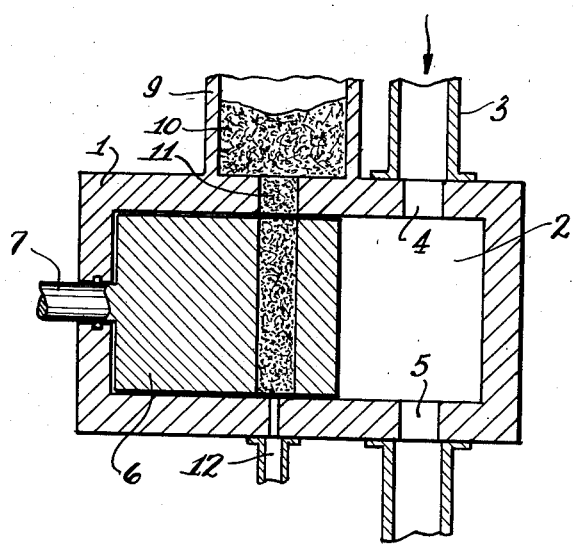
INVENTOR
Norbert Berkowitz
Erik J. Jensen
BY Harold E. Weir
PATENT AGENT

United States Patent Office 3,190,701
Patented June 22, 1965

3,190,701
PIPELINE TRANSPORTATION OF SOLIDS
Norbert Berkowitz and Erik J. Jensen, Edmonton, Alberta, Canada, assignors to Canadian Patents and Development Limited, Ottawa, Ontario, Canada, a company
Filed Feb. 1, 1963, Ser. No. 255,636
4 Claims. (Cl. 302—66)

This invention relates to the pipeline transportation of materials.

In copending application Serial No. 164,887 filed January 8, 1962, there is described a method and apparatus for the pipeline transportation of materials in which the materials are encapsulated before disposition in the liquid carrying medium.

It is an object of this invention to provide a method of transporting materials by pipeline wherein the materials to be transported may be easily subject to formation into a plurality of discrete bodies without use of a solid loading medium, wherein such bodies lend themselves to convenient disposition in and transportation by a carrier stream, wherein such bodies substantially maintain their individual volume and content during transportation in the carrier stream, wherein the bodies may be readily retrieved from the carrier stream, and wherein the materials in the bodies may be easily and quickly recovered from the bodies.

More specifically, it is an object of this invention to provide a method of transporting materials by pipeline by employing a liquid loading medium adapted to be loaded with the materials to be transported and a liquid carrier medium adapted to be employed to transport the loaded medium through a pipeline, the two liquid media being mutually immiscible.

In the ensuing description, reference will be made to the accompanying drawing, in which the single figure illustrates, in somewhat diagrammatic form, a sectional elevation of an apparatus which may be employed to carry out the invention.

It will be apparent that, if two mutually immiscible liquids of approximately equal density in predetermined quantity are made to flow through a pipeline in laminar or mildly turbulent flow (i.e., at low to moderate Reynolds numbers), one of the liquids will form a number of discrete bodies or "slugs," the diameter of each of which is roughly equal to the internal diameter of the line, and these slugs will move along the line with the same velocity as the other liquid without, in general, losing their separate identities.

In accordance with the invention, there are employed two such mutually immiscible liquids, one of which is used as a liquid loading medium and the other of which is used as a liquid carrier medium. The liquid loading medium is loaded with the material to be transported to form a substantially homogeneous body and is then added to the liquid carrier medium in a pipeline in the form of a multiplicity of discrete portions of such body.

Two mutually immiscible liquids which are suitable for purposes of this invention are oil and water. Various types of oils are satisfactory. The hydrocarbon oils, as usually available, are quite effective. Generally, a light petroleum oil (SAE 10 to 20) will be chosen. However, the viscosity of the oil chosen will depend in large degree upon two factors (1) whether it is to be used as the carrier medium or as the loading medium, and (2) the character of the material to be transported.

The material to be transported is incorporated in the loading medium in any suitable manner. Most generally, the material is in comminuted form and pasted with the loading medium during transportation, but, in some instances, it may be in the form of a solution in the loading medium.

Various types of particulate materials may be transported in accordance with the invention. Such materials include coal, sulphur, and potash. The degree of comminution or particle size may vary widely but will generally be in the range of $-12 \times 0$ mesh, and usually in the range of $-48 \times 0$ mesh. An appropriate size distribution, that is, one which permits fairly close packing of the particles in the individual portions is to be desired. Ideally, this would involve a Gaussian particle size distribution; but in practice, this can be approached by proper choice of comminuting equipment to avoid overgrinding or, rather excessive deviation from a Gaussian distribution. In most cases, a size distribution resulting from presently available commercial grinding equipment would prove quite satisfactory.

The consistency of the paste composed of the solids particles and the loading medium, that is, the solids concentration in each individual slug, can vary widely. However, since economics will generally tend to dictate maximum solids loading, the amount of liquid used in preparing the paste will normally be limited to the quantity necessary to yield a readily extrudable paste. Thus, a coal-water paste may be prepared with not more than about 30% water, and a sulfur-oil paste may be prepared with about 10% oil.

Any suitable manner of forming the individual portions from the main body of paste and of injecting them into a pipeline may be employed. One suitable means is illustrated diagrammatically in the drawing in which, 1 is a housing defining a chamber 2. A pipeline 3, through which a stream of liquid carrier medium flows, has a portion thereof interrupted by housing 1 whereby the stream of carrier liquid flows through chamber 2 by means of inlet 4 and outlet 5.

A piston 6 is reciprocally mounted in chamber 2 as by means of piston rod 7. The piston 6 has a passage or mold 8 extending transversely therethrough. A hopper 9 containing paste 10 is mounted on the housing and has an opening 11 communicating with the mold 8 in the withdrawn position of the piston. In such position, paste from the hopper may be extruded through opening 11 into the mold until the latter is substantially filled. The piston is then moved to the other end of the chamber, in which position the mold 8 is aligned with the inlet and outlet of the pipeline and the formed individual portion in the mold is entrained by the stream of carrier liquid. A drain 12 for residual carrier liquid in the mold communicates with the mold in the withdrawn position of the piston.

The liquid carrier is pumped through the pipeline at a flow velocity which is not critical providing that it exceeds the portion pick-up velocity. In practice, the flow velocity of the carrier stream and of the carried portions will be determined by economic considerations which turn, basically, on the energy required for pumping. A convenient and satisfactory velocity is in the range of 2–15 feet per second. Pressure gradients under these conditions will, of course, vary with the individual portion concentration in the line and with the density of the solid commodity being transported. However, these pressures gradients will always be significantly lower than those encountered when moving slurries of equivalent concentration in a pipeline. It should, in this connection, be noted that the individual portions will, like capsules, tend to move slightly faster than the average carrier liquid.

As previously indicated, the lower limit of the velocity range is one that exceeds the pick-up velocity. If the density of the solid commodity does not differ greatly from the density of the carrier liquid, this lower limit is approximately 0.5 feet per second. As the density differential between the solid and the carrier liquid increases, so will the critical pick-up velocity and, hence, the minimum flow velocity. For example, for commodities like coal, it would be possible to operate at any velocity above about 0.5 feet per second; for a substance like potash, a higher minimum velocity of, say 2 feet per second would be indicated.

The individual body portions, prepared and injected as described, will move through a pipeline with the carrier liquid even at high velocities without visible signs of failure. For example, "slugs" containing coal, sulfur and potash have been pipelined at velocities in excess of 5 feet per second without detectable break-up or surface abrasion; and even after prolonged pipelining no significant entry of solid into the carrier fluid occurs. The "slugs" or individual portions can withstand very high turbulence in the carrier stream. Thus, no technical difficulties arise in operations in which the Reynolds number ranges in excess of 40,000.

The dimensional characteristics of the formed portions are relatively unimportant. However, a preferred portion diameter is about ⅘ of the internal pipeline diameter. Moreover, while length:diameter ratios are variable, such ratios are optimally from 5 to 7.

The load factor, i.e., the total pipeline volume occupied by the individual body portions, also may vary very greatly, and may run as high as 90%. Needless to say, the load factor will determine pressure gradients in precisely the same manner as slurry concentration determines the pressure gradients in pipeline transportation of slurries. As previously indicated, pressure gradients when moving "slugs" at any particular load factor will always be lower than those obtained for slurries of equivalent concentration.

One of the advantages of the present invention arises from the possibility of readily varying the load factor if market requirements make this desirable. For instance, if coal "slugs" are moved at a 50% load factor and the market calls suddenly for temporarily greater or smaller quantities of coal, the load factor can be readily increased or reduced without any change in operation other than increasing or decreasing the speed of the carrier liquid pumps (and correspondingly increasing or decreasing the cycle of the portion injector mechanism).

A major advantage of the transportation system described over the more conventional slurry transportation by pipeline, arises, aside from the lower pressure gradients, from the ease of separating the individual body portions from the carrier liquid. It has been found that, in practice, that separation involves no more than a rough screening of the pipeline effluent. Moreover, such a screening is generally sufficient to minimize the quantities of carrier fluid adhering to the body portions. For example, in the movement of coal-in-water "slugs" in an oil carrier, residual oil adhering to the "slugs" after screening is proportional to the external surface of the "slug" and, in the case of a one-half inch diameter by three inch long "slug," of the order of 1% of the total weight of the "slug."

As previously pointed out, the choice of loading and carrier medium depends to a large extent on the material to be transported.

Examples are:
(a) Coal, pasted with water, in a liquid hydrocarbon carrier,
(b) Sulfur, pasted with light oil, in water as a carrier, and
(c) Potash, pasted with its own brine, in oil as a carrier.

There are two attendant advantages of the invention which are of considerable technical importance. Firstly, since the individual portions are non-rigid and capable of assuming configurations largely determined by the pipeline diameter, they can be moved through lines characterized by moderate changes in line diameter and they can also be moved through transient partial line blocks. Secondly, if a portion is accidentally broken up (as by excessive accidental turbulence), the fragments will generally move at a lower velocity than unbroken portions and they may, therefore, either be removed from the line by incorporation into the immediately following portions or by injecting a bubble of the liquid used for initial pasting into the carrier stream. For example, the fragments of a broken coal-water portion moving in an oil-filled line can be collected by moving a water "slug" along the line.

As hereinbefore indicated, the material to be transported may be in the form of discrete bodies or slugs composed of a solution of, say, a mineral such as potash. A modification of this form of the invention resides in the case of a solution-mined mineral (such as potash) which is first condensed to a point at which a "mush" of small crystals forms, and slugs of the resultant "mush" are injected into the carrier stream (such as oil) in the pipeline.

We claim:
1. A method of transporting a particular solid substance which comprises forming an extrudable paste of said substance and a loading liquid, forming from said paste a multiplicity of discrete, substantially coherent bodies, and injecting said discrete bodies in successive order into a pipeline containing a flowing stream of carrier liquid immiscible with said loading liquid.

2. A method of transporting a particulate solid substance as defined in claim 1, wherein one of said liquids is a hydrocarbon oil and the other of said liquids is water.

3. A method of transporting a particulate solid substance as defined in claim 1, wherein said substance has a particle size in the range —12 x 0 mesh.

4. A method of transporting coal in particulate form which comprises forming a paste of said coal with not substantially more than 30% water, forming from said paste a multiplicity of discreate, substantially coherent bodies, and injecting said discrete bodies in successive order into a pipeline containing a flowing stream of hydrocarbon oil.

References Cited by the Examiner

UNITED STATES PATENTS

| 2,672,372 | 3/54 | Jones | 302—66 |
| 2,686,085 | 8/54 | Odell | 302—66 |
| 2,920,923 | 1/60 | Wasp | 302—14 |
| 3,001,828 | 9/61 | Stadlaender | 302—14 |

FOREIGN PATENTS 939,018   2/56   Germany.

SAMUEL F. COLEMAN, *Primary Examiner.*

ANDRES H. NIELSEN, *Examiner.*